March 21, 1961 W. A. MOREY 2,976,051
ADJUSTABLE TRAILER SUSPENSION
Filed Sept. 10, 1958 2 Sheets-Sheet 1
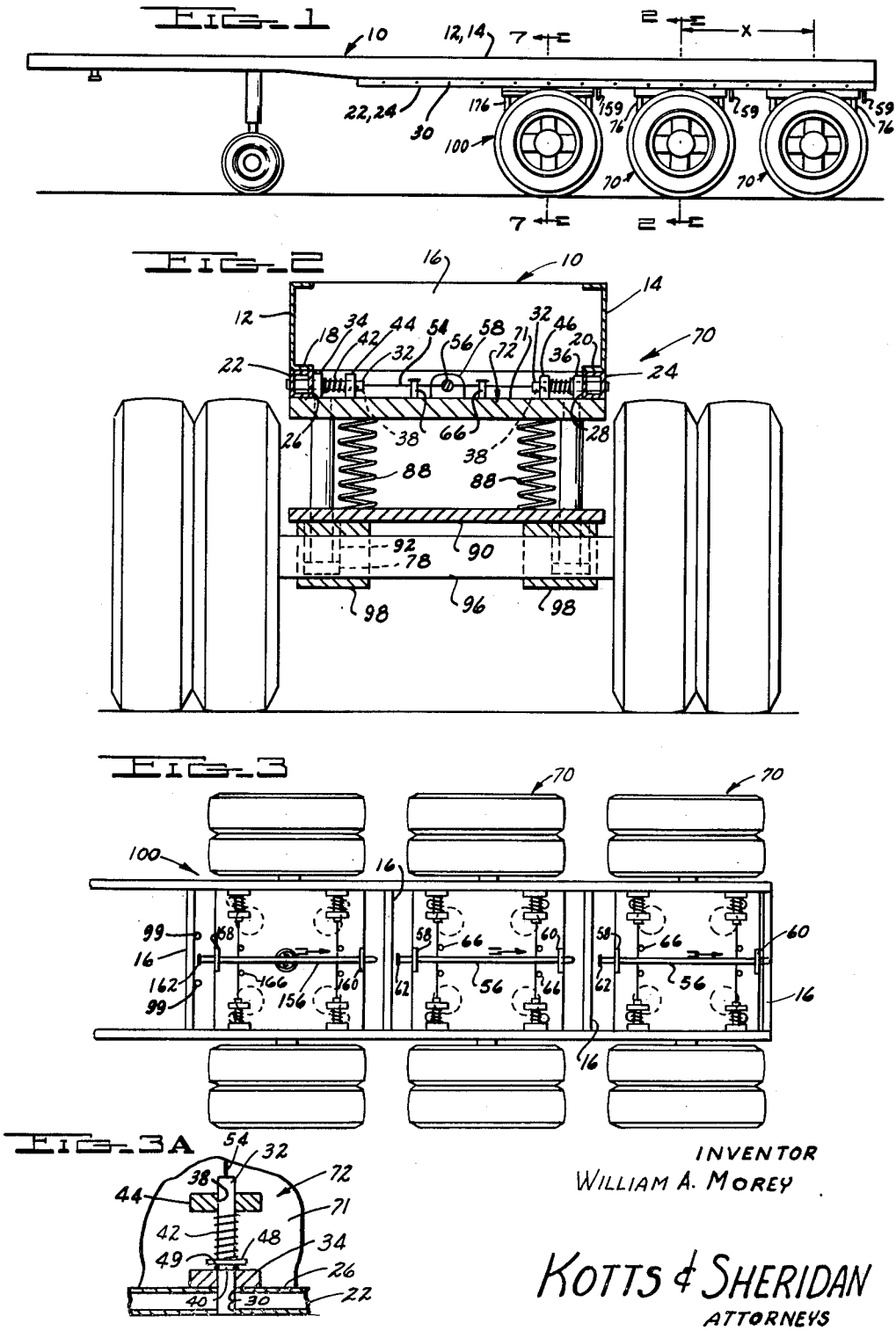
INVENTOR
WILLIAM A. MOREY
KOTTS & SHERIDAN
ATTORNEYS March 21, 1961 W. A. MOREY 2,976,051
ADJUSTABLE TRAILER SUSPENSION
Filed Sept. 10, 1958 2 Sheets-Sheet 2
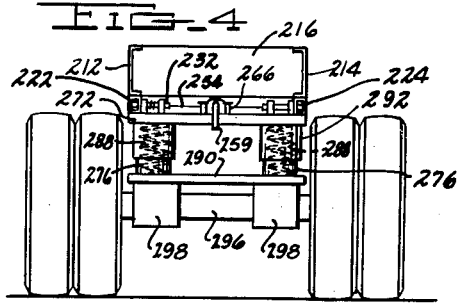
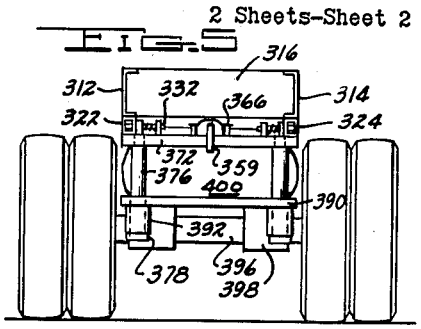
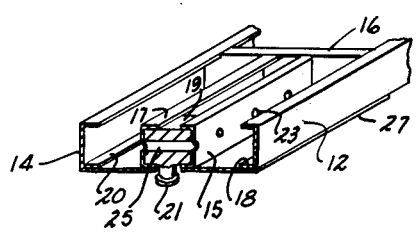
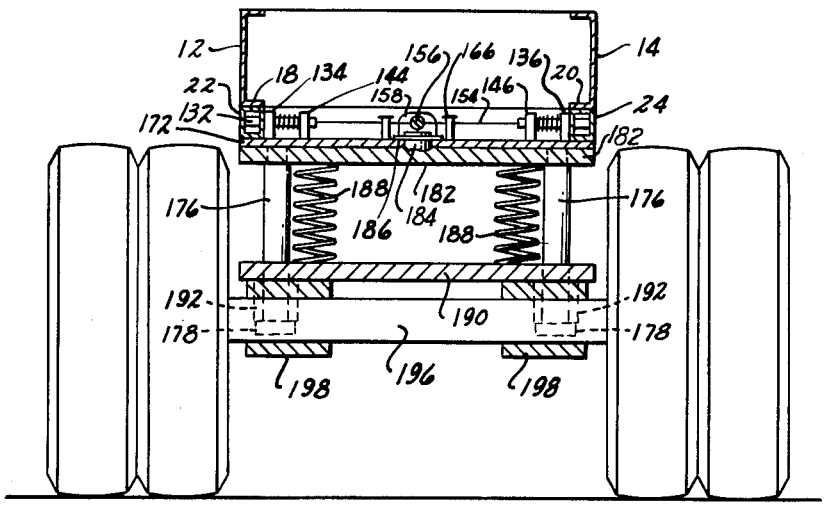
INVENTOR
WILLIAM A. MOREY
KOTTS & SHERIDAN
ATTORNEYS 2,976,051
ADJUSTABLE TRAILER SUSPENSION
William A. Morey, 2045 N. Elizabeth, Dearborn, Mich.
Filed Sept. 10, 1958, Ser. No. 760,233
6 Claims. (Cl. 280—81)

The present invention relates to new and useful improvements in adjustable running gears for vehicles and more particularly to a vertically displaced, sway free, semi-trailer suspension.

The desirability and need for an adjustable, sway free, suspension device has been long recognized and needed in the field, although to date, no satisfactory product has been developed to fill that need.

In inter-state transportation, it is very often necessary, at the State line, to transfer cargo from one trailer to another. This transfer being made necessary by the inability of the trailer to meet restrictions of that particular State.

It is therefore an object of the present invention to provide a trailer having an adjustable running gear, wherein the length of the trailer bed may be altered readily and with a minimum of effort to meet the restrictions which prevail in that particular State.

Still another object of the present invention is the provision of a trailer having a vertically displaced adjustable suspension, in which road sway is virtually eliminated and an equal distribution of weight occurs on each axle.

Another object of the present invention is the provision of a trailer structure wherein the king pin is slidably positioned in a longitudinal track, to permit adjustment and make possible the increase or decrease of load applied to a tractor.

Still another object of this invention is the provision of a trailer to which axles may be added to or deleted from as the load and need presents itself.

Another object of the present invention is the provision of a dual purpose axle for use with a multiple axle trailer, having a built in pivotal fifth wheel structure on the forward axle to eliminate scrub on turns.

The foregoing and related objects can be accomplished by the provision of a trailer structure having a pair of longitudinal side rails in spaced relationship forming a frame structure; a longitudinally adjustable king pin secured in said frame; a pair of beams beneath said frame structure; a plurality of axles adjustably secured to said beams, said axle assemblies comprising a rectangular upper and lower mounting plate; said upper plate secured to said beams; a straight axle secured to said lower plate; four pilot posts, one secured to each corner of said upper plate; four sleeve bearings on said lower plate beneath said pilot posts and in alignment therewith; said pilot posts slidably positioned in said bearings; resilient means separating said upper and lower plates; means for limiting extension of said resilient means; and a pivotal fifth wheel structure on the forward axle of a multiple axle rig to eliminate scrub on turns.

Other objects of this invention will appear in the following description and appended claims, reference being had to the accompanying drawings forming a part of this specification wherein like reference characters designate corresponding parts in the several views.

In the drawings:
Fig. 1 is a side elevational view of a trailer embodying the present invention.
Fig. 2 is an enlarged cross sectional view taken along lines 2—2 of Fig. 1.
Fig. 3 is an enlarged top plan view of the rear end of the trailer shown in Fig. 1.
Fig. 3A is an enlarged plan view, broken away, of a single locating pin assembly.
Fig. 4 is an end view of a modified form of the present invention.
Fig. 5 is an end view of a second modified form of the present invention.
Fig. 6 is a perspective view of the forward portion of the trailer, illustrating the longitudinally adjustable king pin mount.
Fig. 7 is an enlarged cross sectional view similar to Fig. 2 illustrating the pivotally mounted axle assembly.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings, Fig. 1 illustrates a side elevational view of a multiple axle trailer embodying the present invention. The forward axle assembly 100, is pivotal, the remaining axle assemblies 70 being straight and fixed. The trailer frame assembly 10 is comprised of two longitudinal side rails 12 and 14, which are separated by cross members 16. Secured immediately beneath the longitudinal frame members 12 and 14 are a pair of box beam members 22 and 24. These beam members are secured to the frame by welding, however, they may be secured by any suitable means, such as rivets or nuts and bolts.

Along the length of beams 22 and 24, are located a plurality of spaced openings 30. Each beam having these openings machined therein before assembly with the frame structure 10. When the beams 22 and 24 are properly assembled, the openings will be opposed to each other and in parallel relationship to the lower flanges 18 and 20 of side rails 12 and 14. Each of said openings 30, is cooperable to receive an axle locating pin 32 adjustably mounted on a pair of brackets on the upper surface 71 of the rectangular top plate 72 on axle assembly 70.

The axle locating pins 32 are best viewed in Figs. 3 and 3A of the drawings. Extending vertically upward from the top surface 71 of plate 72, are a plurality of ear members 34 and 36. The outside surface of ear 34 lying in parallel relationship to the inside face 26 of box beam 22, while the outside surface of ear 36 lies in parallel relationship to the inside face 28 of box beam 24. A second set of ears 44 and 46 are in spaced relationship to, and in alignment with ears 34 and 36 and have openings 38 therethrough for receiving axle locator pins 32.

The axle locator pins 32 are actuated by compression springs 42 positioned between ears 34 and 44 and 36 and 46 on the top plate 72. One end of compression spring 42 engages the outside face of ear 44, while the opposite end of the spring engages a washer member 48 positioned by a snap ring 49 located in a groove 40 in the axle locator pin 32. All four locator pins 32 on each axle assembly are made so as to operate in the same manner. A wire cable 54 is connected to each end of the locator pins 32, which is in turn secured to a central longitudinal actuating rod 56. Rod 56 is piloted in two aligned openings, one located in each of two upstanding flanges 58 and 60. The forward end of rod 56 has an enlarged end portion 62 threadedly affixed thereto, for limiting the longitudinal movement thereof. The rearward portion of actuating rod 56 has a right angled bend therein, forming a handle 59 for disengaging the axle locating pins 32. A plurality of dowels 66 are located in the upper surface 71 of plate 72 to prevent cocking of the axle locator pins 32, when the actuator rod 56 is moved in the direction of the arrow to withdraw the pins 32.

Threadedly affixed to each of the four corners of the rectangular upper mounting plate 72, and drawn against the lower surface 73 thereof, are four vertically mounted pilot posts 76. The lower ends of the pilot posts 76 have an enlarged end portion 78 which engages the lower edge of a sleeve bearing 92 mounted on the lower axle mounting plate assembly 90. The sleeve bearings 92 are four in number and are positioned below, and in alignment with the pilot posts 76. Intermediate mounting plates 72 and 90 are located four coil springs 88, one in each corner of the assembly.

A dual wheeled axle 96 is clamped by any suitable means to the underside of the lower plate 90 with clamps 98.

With the above described single axle construction, road sway in a trailer is virtually eliminated, since any load applied to the trailer frame structure must act in a vertical direction.

An oil reservoir (not shown) with suitable conduits is secured to the underside of the upper plate 72 for lubricating all four pilot posts 76 and bearings.

The pivotal axle assembly 100 is illustrated in Fig. 7 of the drawings, and is mounted to box beam members 22 and 24 in the same manner as the straight axles. The axle locating pins 132 extend into openings 30 in the box beam members, and are mounted in vertically extending ears 134 and 136, positioned on the top surface of the pivotal mounting plate 172. Immediately below the pivotal plate 172, is a fixed plate 182 which has mounted thereon four pilot posts 176. Extending upwardly from the fixed plate 182, is a round pin 184 held in engagement with the pivotal plate 172 by a snap ring 186. A pair of downwardly depending rods 99 are positioned on the forward cross member 16 and limit movement of the pivotal axle assembly 100.

Compression springs are positioned between ears 134 and 144 and 136 and 146, as in the case of the straight axle. A wire cable 154 is secured to each end of the axle locator pins 132 and in turn connected to a centrally located longitudinal actuating rod 156. The actuating rod 156 is piloted in two centrally located upstanding flanges. Flange 158 is on the forward edge of the rectangular mounting plate. The forward edge of the actuating rod 156 has an enlarged end 162 secured thereto, and limits the longitudinal travel of the actuating rod, while the other end of actuating rod 156 has a right angled bend therein, forming a handle member 159. Movement of the handle 159 in the direction of the arrow disengages the locator pins 132 from the beam members 22 and 24, allowing the axle assembly to be moved forward or back as desired or completely removed. Vertical dowel members 166 are positioned in plate 172 adjacent to the axle locator pins so as to permit the wire cable 154 to exert a straight pull on the axle locator pins 132 during their removal from box beam members 22 and 24.

Each of the four corners of the rectangular mounting plate 172 has mounted thereon, pilot posts 176, which are slidably mounted in sleeve bearings 192 positioned below, and in alignment with the aforementioned pilot posts 176. An enlarged end portion 178, on the lower end of the pilot post 176, limits the extension of coil springs 188, positioned between mounting plates 172 and 190.

Fig. 4 illustrates a modified form of the present invention which has a pair of longitudinal side rails 212 and 214 forming a frame structure. The frame members 212 and 214 are spaced apart by cross members 216. Mounted beneath the side rails 212 and 214 are two box beam members 222 and 224. Axle locator pins 232 are mounted in a plurality of upstanding ear members, extending from the top of mounting 272. Located on each of the four corners of the mounting plate 272, are bearing members 276 and 292 which enclose coil springs 288. Bearing section 292 is mounted on the underside of the upper mounting plate 272, while bearing member 276 slides inside and is mounted on the top of the lower mounting plate 290. The straight axle 296, is positioned in caps 298, mounted to the underside of mounting plate 290. This type construction provides an adjustable totally enclosed, swap free, vertically displaced trailer wheel and axle suspension.

Fig. 5 illustrates a second modified form of the invention wherein an air pillow 400 replaces the coil spring members. Longitudinal frame members 312 and 314 have welded to their respective lower flanges, a pair of box beam members 322 and 324. Cable actuated axle locator pins 332 cooperable with openings in the beams 322 and 324 are mounted on the top surface of the top rectangular plate 372, while four pilot posts 376 having enlarged base portion 378 are mounted to the corners on the underside. Sleeve bearing members 392 are positioned beneath, on a similar plate 390, along with a straight axle 396 and wheel assembly. The axle is held in position by caps 398, secured by any suitable means to the underside of mounting plate 390. This modified structure provides an adjustable, vertically disposed, sway free, air suspension, for use with a trailer.

In Fig. 6 longitudinal side rails 12 and 14 are shown with a second set of rails 15 and 17 centrally positioned therebetween. A block 19 is slidably positioned between rails 15 and 17 and carries a king pin 21. Several openings 23 in the rails 15 and 17 make it possible to relocate the king pin 21 at will by inserting a pin (not shown) through one of openings 23 in the rails and through opening 25 in block 19, thereby forming a slidably adjustable king pin construction.

From the foregoing description, it will be apparent to one skilled in the art, that the trailer suspension is simple and inexpensive to manufacture, and its use will satisfy the need for an adjustable axle construction wherein axles and the king pin as well as the axles may be moved at will, to satisfy State laws both as to the distance between axles and the load applied to same, resulting in less road damage and reduced wear to tires.

Having thus described my invention, I claim:

1. In an adjustable dead axle construction for use on a trailer, the combination of a pair of longtiudinal side rails and a plurality of cross members forming a frame structure; a pair of beams secured to and positioned below said side rails; an axle assembly adjustably secured to said beams; said axle assembly comprising an upper and lower mounting plate; means on said upper mounting plate for locating and positioning said axle assembly on said beams; a dual wheel axle secured to said lower mounting plate; a plurality of vertical pilot posts slidably mounted between said mounting plates; resilient means interposed between said mounting plates for suspension of a load on said frame; and means for limiting extension of said resilient means.

2. In an adjustable dead axle construction for use on a trailer, the combination of a pair of longitudinal side rails and a plurality of cross members forming a frame structure; a pair of beams secured to and positioned below said side rails; an axle assembly adjustably secured to said beams; said axle assembly comprising a rectangular upper and lower mounting plate; means on said upper mounting plate for locating and positioning said axle assembly on said beams; a dual wheel axle secured to said lower mounting plate; vertical pilot posts slidably mounted on each of four corners of said upper and lower mounting plates to align said upper and lower mounting plates with respect to said frame; coil springs interposed between said mounting plates for suspension of a load on said frame.

3. In an adjustable dead axle construction for use on a trailer, the combination of a pair of longitudinal side rails and a plurality of cross members forming a frame structure; a pair of beams secured to and positioned below said side rails; a plurality of horizontal openings in spaced relationship along the length of said beams; an axle assembly; said axle assembly comprising a generally flat rectangular upper and lower mounting plate; spring loaded means horizontally positioned on said upper plate for locating and positioning said axle assembly on said beams; a dual wheel axle secured to said lower mounting plate; vertical pilot posts slidably mounted on each of four corners of said rectangular upper and lower mounting plates to align said upper and lower mounting plates with respect to said frame, resilient means interposed between said mounting plates for suspension of a load on said frame; and means for limiting extension of said resilient means.

4. A device as in claim 3, wherein said pilot posts house said resilient coil springs.

5. A device as in claim 3 wherein said resilient means comprises a pneumatic pillow.

6. In an adjustable dead axle construction for use on a trailer, the combination of a pair of longitudinal side rails and a plurality of cross members forming a frame structure; a second set of longitudinal rails on the forward end of said frame structure; an adjustable king pin slidably position intermediate said rails; a pair of beams secured to and positioned below said side rails; a plurality of aligned openings positioned in spaced relationship along the length of said beams; a plurality of axles adjustably secured to said beams, to distribute the load throughout the frame; the forward axle of said plurality of axles pivotally mounted to prevent scrub on turns, the balance of said axles being straight, said pivotal axle comprising a pair of upper mounting plates; a single lower mounting plate; a pivotal post centrally located on the top surface of the upper plate; an opening on the topmost mounting plate to receive said pivotal post; means for pivotally securing said plates together; means on said topmost plate for locating and positioning said pivotal axle assembly on said beams; a dual wheeled axle secured to said lower mounting plate; a plurality of pilot posts vertically mounted between said upper mounting plate and said lower mounting plate; coil springs interposed between said mounting plates for suspension of a load on said frame structure; means for limiting extension of said spring means; and means for limiting rotation of said pivotal axle assembly.

References Cited in the file of this patent

UNITED STATES PATENTS

| | | |
|---|---|---|
| 699,709 | Pulbrook | May 13, 1902 |
| 1,022,225 | Chabot | Apr. 2, 1912 |
| 1,151,858 | Brock | Aug. 31, 1915 |
| 2,332,326 | Lex | Oct. 19, 1943 |
| 2,621,055 | O'Kelley | Dec. 9, 1952 |
| 2,731,276 | Cross | Jan. 17, 1956 |
| 2,838,324 | Dalton | June 10, 1958 |
| 2,839,311 | Locker | June 17, 1958 |
| 2,841,411 | Sheppard et al. | July 1, 1958 |
| 2,889,154 | De Lay | June 2, 1959 |